(12) United States Patent
Kakubo et al.

(10) Patent No.: US 9,951,210 B2
(45) Date of Patent: Apr. 24, 2018

(54) RUBBER COMPOSITION FOR TIRE AND STUDLESS WINTER TIRE

(71) Applicant: The Yokohama Rubber Co., LTD., Minato-ku, Tokyo (JP)

(72) Inventors: Takashi Kakubo, Hiratsuka (JP); Kazushi Kimura, Hiratsuka (JP); Keisuke Maejima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/024,793

(22) PCT Filed: Sep. 22, 2014

(86) PCT No.: PCT/JP2014/075107
§ 371 (c)(1),
(2) Date: Mar. 24, 2016

(87) PCT Pub. No.: WO2015/046154
PCT Pub. Date: Apr. 2, 2015

(65) Prior Publication Data
US 2016/0237253 A1    Aug. 18, 2016

(30) Foreign Application Priority Data

Sep. 26, 2013 (JP) ................. 2013-200452
Sep. 26, 2013 (JP) ................. 2013-200453

(51) Int. Cl.
| | | |
|---|---|---|
| C08L 7/00 | (2006.01) | |
| B60C 11/14 | (2006.01) | |
| B60C 1/00 | (2006.01) | |
| C08K 3/00 | (2018.01) | |
| C08K 3/04 | (2006.01) | |
| C08L 9/00 | (2006.01) | |
| C08L 101/00 | (2006.01) | |
| C08L 101/02 | (2006.01) | |
| B60C 11/00 | (2006.01) | |

(52) U.S. Cl.
CPC ....... *C08L 7/00* (2013.01); *B60C 1/00* (2013.01); *B60C 1/0016* (2013.01); *B60C 11/0008* (2013.01); *B60C 11/14* (2013.01); *C08K 3/00* (2013.01); *C08K 3/04* (2013.01); *C08L 9/00* (2013.01); *C08L 101/00* (2013.01); *C08L 101/02* (2013.01); *B60C 2011/0016* (2013.01)

(58) Field of Classification Search
CPC ........ C08L 7/00; C08L 101/00; C08L 101/02; C08L 9/00; B60C 1/00; B60C 1/0016; B60C 11/0008; B60C 11/14; B60C 2011/0016; C08K 3/00; C08K 3/04
See application file for complete search history.

(56) References Cited

U.S. PATENT DOCUMENTS

2014/0100321 A1    4/2014   Maejima et al.

FOREIGN PATENT DOCUMENTS

| JP | H01-0167348 | 7/1989 |
|---|---|---|
| JP | H10-0168234 | 6/1998 |
| JP | 2000-273181 | 10/2000 |
| JP | 2002-080642 | * 3/2002 |
| JP | 2009-167339 | 7/2009 |
| JP | 2011-168740 | 9/2011 |
| JP | 2012-036268 | 2/2012 |
| JP | 2012-131920 | * 7/2012 |
| JP | 2013-010967 | 1/2013 |
| JP | 2013-100381 | 5/2013 |
| WO | WO 2012/144605 | 10/2012 |

OTHER PUBLICATIONS

Alger, M.; Polymer Science Dictionary, 1997, p. 114.*
International Search Report for International Application No. PCT/JP2014/075107 dated Jan. 6, 2015, 4 pages, Japan.

* cited by examiner

*Primary Examiner* — Robert Jones, Jr.
(74) *Attorney, Agent, or Firm* — Thorpe Noah & Western (57) ABSTRACT

The present technology provides a rubber composition for a tire with which it is possible to produce a tire having excellent on-ice performance and excellent wear resistance, and a studless winter tire using the rubber composition. The rubber composition for a tire of the present technology is a rubber composition for a tire comprising: 100 parts by mass of a diene rubber (A); from 30 to 100 parts by mass of carbon black and/or a white filler (B); and from 0.3 to 30 parts by mass of a cured product (C) prepared by curing a crosslinkable oligomer or polymer (c1) incompatible with the diene rubber (A); a JIS A hardness of the cured product (C) being from 3 to 45.

12 Claims, 3 Drawing Sheets

RUBBER COMPOSITION FOR TIRE AND STUDLESS WINTER TIRE

TECHNICAL FIELD

The present technology relates to a rubber composition for a tire and a studless winter tire.

BACKGROUND ART

Rubber compositions for tires capable of roughening the tread surface of a tire and increasing the affinity with ice have been developed conventionally with the objective of improving the on-ice friction of a studless winter tire.

For example, International Patent Publication No. WO/2012/144605 describes "a rubber composition for a tire comprising: 100 parts by mass of a diene rubber (A); from 30 to 100 parts by mass of carbon black and/or a white filler (B); from 0.3 to 30 parts by mass of a crosslinkable oligomer or polymer (C) which is incompatible with the diene rubber (A); and from 0.1 to 12 parts by mass of three-dimensionally crosslinked microparticles (D) having an average particle size of from 1 to 200 μm" ([claim 1]). In addition, Japanese Unexamined Patent Application Publication No. 2013-010967A describes "a rubber composition for a studless winter tire comprising: 100 parts by mass of a diene rubber (A); from 30 to 100 parts by mass of carbon black and/or a white filler (B); from 0.3 to 30 parts by mass of a crosslinkable oligomer or polymer (C) which is incompatible with the diene rubber (A); and from 0.1 to 12 parts by mass of three-dimensionally crosslinked microparticles having an average particle size of from 1 to 200 μm" ([claim 1]).

However, when the present inventors conducted extensive research on the rubber compositions for tires described in International Patent Publication No. WO/2012/144605 and Japanese Unexamined Patent Application Publication No. 2013-010967A, it became clear that there is room for improvement in the on-ice performance and wear resistance.

SUMMARY

The present technology provides a rubber composition for a tire with which it is possible to produce a studless winter tire having excellent on-ice performance and excellent wear resistance, and a studless winter tire using the rubber composition.

As a result of conducting dedicated research, the present inventors discovered that a studless winter tire having excellent on-ice performance and excellent wear resistance can be produced by using a rubber composition containing a cured product having a specific hardness prepared by curing a prescribed crosslinkable oligomer or polymer in advance (prior to vulcanization).

A rubber composition for a tire may have the following features.

(1) A rubber composition for a tire comprising: 100 parts by mass of a diene rubber (A); from 30 to 100 parts by mass of carbon black and/or a white filler (B); and from 0.3 to 30 parts by mass of a cured product (C) prepared by curing a crosslinkable oligomer or polymer (c1) which is incompatible with the diene rubber (A); a JIS (Japanese Industrial Standard) A hardness of the cured product (C) being from 3 to 45.

(2) The rubber composition for a tire described in (1) further comprising from 0.1 to 12 parts by mass of three-dimensionally crosslinked microparticles (D) having an average particle size of from 0.5 to 50 μm; wherein the microparticles (D) are present inside the cured product (C).

(3) The rubber composition for a tire described in (1) or (2), wherein the cured product (C) is a particulate having an average particle size of from 5 to 250 μm.

(4) The rubber composition for a tire described in any one of (1) to (3), wherein a JIS A hardness of the cured product (C) is from 3 to 30.

(5) The rubber composition for a tire described in any one of (1) to (4), wherein the microparticles (D) are prepared by three-dimensionally crosslinking an oligomer or polymer (d1) which is incompatible with the crosslinkable oligomer or polymer (c1).

(6) The rubber composition for a tire described in anyone one of (1) to (5), wherein the crosslinkable oligomer or polymer (c1) is a polyether-based, polyester-based, polyolefin-based, polycarbonate-based, aliphatic, unsaturated hydrocarbon-based, acrylic, plant-derived, or siloxane-based polymer or copolymer.

(7) The rubber composition for a tire described in anyone one of (1) to (6), wherein the crosslinkable oligomer or polymer (c1) is a polyether-based or siloxane-based polymer or copolymer and has a silane functional group.

(8) The rubber composition for a tire described in anyone one of (1) to (7), wherein the diene rubber (A) contains at least 30 mass % of at least one type selected from the group consisting of natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), and derivatives of each of these rubbers.

(9) The rubber composition for a tire described in anyone one of (5) to (8), wherein the oligomer or polymer (d1) is a polyether-based, polycarbonate-based, aliphatic, unsaturated hydrocarbon-based, acrylic, or plant-derived polymer or copolymer.

(10) The rubber composition for a tire described in (9), wherein the crosslinkable oligomer or polymer (c1) is a polyether-based, polyester-based, polyolefin-based, polycarbonate-based, acrylic, or plant-derived polymer or copolymer; and the oligomer or polymer (d1) is an aliphatic polymer or copolymer.

(11) The rubber composition for a tire described in any one of (1) to (10), wherein the crosslinkable oligomer or polymer (c1) has at least one reactive functional group selected from the group consisting of hydroxyl groups, silane functional groups, isocyanate groups, (meth) acryloyl groups, allyl groups, carboxy groups, acid anhydride groups, and epoxy groups.

(12) The rubber composition for a tire described in (11), wherein the oligomer or polymer (d1) has at least one reactive functional group selected from the group consisting of hydroxyl groups, mercapto groups, silane functional groups, isocyanate groups, (meth) acryloyl groups, allyl groups, carboxy groups, acid anhydride groups, and epoxy groups, the reactive functional group differing from the reactive functional group of the crosslinkable oligomer or polymer (c1).

(13) The rubber composition for a tire described in (12), wherein the microparticles (D) are microparticles prepared by three-dimensional crosslinking using the reactive functional group of the oligomer or polymer (d1) in the crosslinkable oligomer or polymer (c1); and the cured product (C) is prepared by curing the crosslinkable oligomer or polymer (c1) using at least one type of catalyst selected from the group consisting of acid catalysts, alkali catalysts, metal catalysts, and amine catalysts after three-dimensionally crosslinking the oligomer or polymer (d1) in the crosslinkable oligomer or polymer (c1).

(14) A studless winter tire using the rubber composition for a tire described in any one of (1) to (13) for a tire tread.

As demonstrated below, by means of the present technology, it is possible to provide a rubber composition for a tire with which it is possible to produce a studless winter tire having excellent on-ice performance and excellent wear resistance, and a studless winter tire using the rubber composition.

DETAILED DESCRIPTION

[Rubber Composition for a Tire]

The rubber composition for a tire of the present technology is a rubber composition for a tire comprising: 100 parts by mass of a diene rubber (A); from 30 to 100 parts by mass of carbon black and/or a white filler (B); and from 0.3 to 30 parts by mass of a cured product (C) prepared by curing a crosslinkable oligomer or polymer (c1) which is incompatible with the diene rubber (A); a JIS A hardness of the cured product (C) being from 3 to 45.

In the present technology, by using a rubber composition in which the cured product (C) is present, as described above, the on-ice performance and the wear resistance of a studless winter tire in which the rubber composition for a tire of the present technology is used for a tire tread both become favorable.

Although the reason is not clear in detail, it is assumed to be as follows.

Specifically, not only is the locally applied strain dispersed and the stress alleviated by the cured product (C) having a prescribed hardness, but the followability and responsiveness of the studless winter tire with respect to the road surface also improve, which is thought to enhance the on-ice performance and wear resistance.

Figure 2:
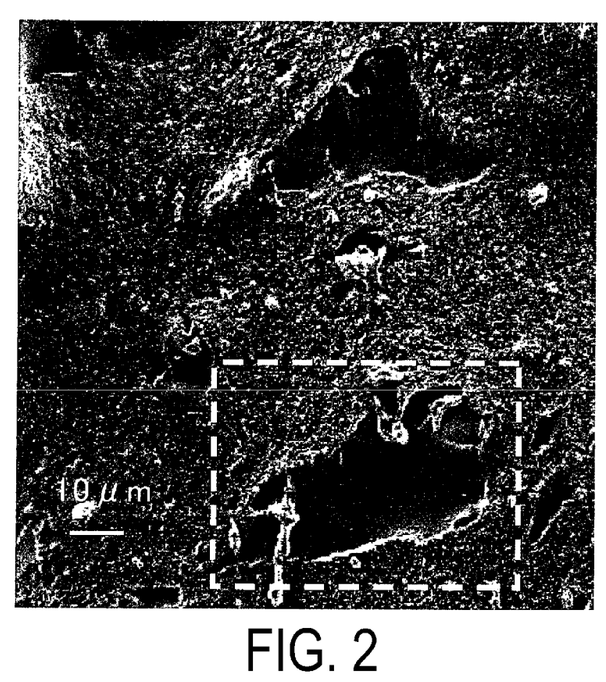
FIG. 2 is a photograph of the cross-section of a vulcanization test sample of the rubber composition for a tire prepared in Working Example 1-3 at a magnification of 500× using a scanning microscope.
Figure 4:
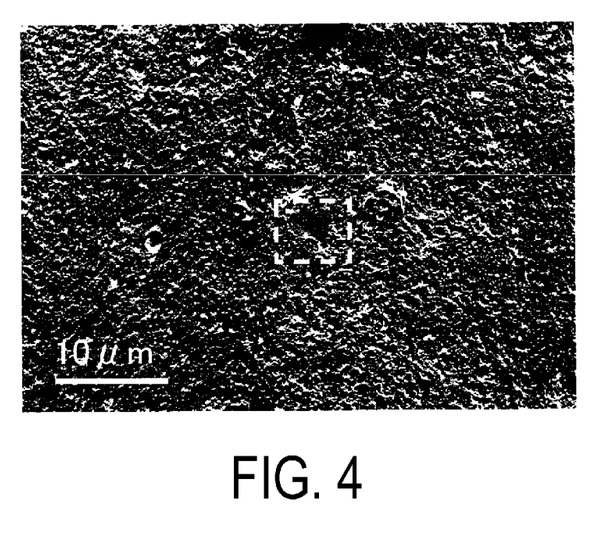
FIG. 4 is a photograph of the cross-section of a vulcanization test sample of the rubber composition for a tire prepared in Comparative Example 1-1 at a magnification of 2000× using a scanning microscope.

Here, in the rubber composition for a tire of the present technology, in contrast to the rubber compositions for tires described in International Patent Publication No. WO/2012/144605 and Japanese Unexamined Patent Application Publication No. 2013-010967A, by curing a crosslinkable oligomer or polymer which is incompatible with the diene rubber in advance prior to vulcanization, the particle sizes or dispersion states of particles (cured product after vulcanization) derived from the cured product (C) [the crosslinkable oligomer or polymer (c1) in Comparative Example 1] after vulcanization differ, as illustrated in FIG. 2 (Working Example 1-3) and FIG. 4 (Comparative Example 1), for example.

Therefore, the aforementioned alleviation of stress or the followability and responsiveness to the road surface are presumed to originate from the particle size, hardness, or the like of the particulate after vulcanization.

In addition, from the perspective of ensuring even better on-ice performance and wear resistance, the rubber composition for a tire of the present technology preferably further contains from 0.1 to 12 parts by mass of three-dimensionally crosslinked microparticles (D) having an average particle size of from 0.5 to 50 μm, and the microparticles (D) are preferably present inside the cured product (C).

Although the reason is not clear in detail, it is assumed to be as follows.

Specifically, not only is the locally applied strain dispersed and the stress alleviated by the cured product (C) having a prescribed hardness and containing the microparticles (D) therein, but the followability and responsiveness of the studless winter tire with respect to the road surface also improve, which is thought to further enhance the on-ice performance and wear resistance.

Each component contained in the rubber composition for a tire of the present technology will be described in detail hereinafter.

<Diene Rubber (A)>

The diene rubber (A) contained in the rubber composition for a tire of the present technology is not particularly limited as long as it has double bonds in its main chain, and specific examples thereof include natural rubber (NR), isoprene rubber (IR), butadiene rubber (BR), acrylonitrile-butadiene rubber (NBR), styrene-butadiene rubber (SBR), styrene-isoprene rubber (SIR), and styrene-isoprene-butadiene rubber (SIBR). One type of these may be used alone, or two or more types may be used in combination.

In addition, the diene rubber (A) may be a derivative in which a terminal or side chain of each rubber described above is altered (modified) by an amino group, an amide group, a silyl group, an alkoxy group, a carboxy group, a hydroxy group, an epoxy group, or the like.

Of these, it is preferable to use NR, BR, and SBR in that the on-ice performance of the studless winter tire is improved, and it is more preferable to use NR and BR in combination.

In the present technology, the average glass transition temperature of the diene rubber (A) is preferably at most −50° C. in that the hardness of the studless winter tire can be kept low even at low temperatures and that the on-ice performance is improved.

Here, the glass transition temperature is the value determined at a temperature elevation speed of 10° C./min in accordance with ASTMD3418-82 using a differential scanning calorimeter (DSC) manufactured by DuPont.

The average glass transition temperature is the average value of the glass transition temperature, and when only one type of diene rubber is used, refers to the glass transition temperature of that diene rubber, while when a combination of two or more types of diene rubbers is used, refers to the glass transition temperature of the entire diene rubber (mixture of each diene rubber) and can be calculated as the average value from the glass transition temperature of each diene rubber and the compounding ratio of each diene rubber.

In addition, in the present technology, it is preferable for at least 20 mass % of the diene rubber (A) to be NR and more preferable for at least 40 mass % to be NR in that the strength of the studless winter tire is favorable.

<Carbon Black and/or White Filler (B)>

The rubber composition for a tire of the present technology contains carbon black and/or a white filler (B).

(Carbon Black)

Specific examples of the carbon black are furnace carbon blacks such as SAF, ISAF, HAF, FEF, GPF, and SRF, and one of these can be used alone, or a combination of two or more can be used.

Moreover, the carbon black is preferably one having a nitrogen specific surface area ($N_2SA$) of from 10 to 300 $m^2/g$ and more preferably from 20 to 200 $m^2/g$ from the perspective of the workability when mixing the rubber composition, the reinforcing property of the studless winter tire, and the like, and the $N_2SA$ is preferably from 50 to 150 $m^2/g$ and more preferably from 70 to 130 $m^2/g$ in that the wet performance of the studless winter tire improves and the on-ice performance is improved.

Here, the $N_2SA$ is a value of the amount of nitrogen adsorbed to a surface of carbon black, measured in accordance with JIS K6217-2:2001 (Part 2: Determination of specific surface area—Nitrogen adsorption methods—Single-point procedures).

(White Filler)

Specific examples of the white filler are silica, calcium carbonate, magnesium carbonate, talc, clay, alumina, aluminum hydroxide, titanium oxide, and calcium sulfate. One of these can be used alone, or a combination of two or more can be used.

Of these, silica is preferable in that the on-ice performance of the studless winter tire is improved.

Specific examples of the silica are wet silica (hydrous silicic acid), dry silica (silicic anhydride), calcium silicate, and aluminum silicate. One type of these may be used alone, or two or more types may be used in combination.

Of these, wet silica is preferable in that the on-ice performance of the studless winter tire is further improved and in that the wear resistance is also further enhanced.

The CTAB (Cetyltrimethyl Ammonium Bromide) adsorption specific surface area is preferably from 50 to 300 $m^2/g$, more preferably from 70 to 250 $m^2/g$, and even more preferably from 90 to 200 $m^2/g$ in that the wet performance and rolling resistance of the studless winter tire are improved. Here, the CTAB adsorption specific surface area is the value of the adsorbed amount of n-hexadecyltrimethylammonium bromide on the silica surface measured in accordance with JIS K6217-3:2001 "Part 3: Method for determining specific surface area—CTAB adsorption method."

In the present technology, the content of the carbon black and/or the white filler (B) is from 30 to 100 parts by mass, and preferably from 40 to 90 parts by mass, and more preferably from 45 to 80 parts by mass per 100 parts by mass of the diene rubber (A) in total of the carbon black and the white filler.

Here, the "content of the carbon black and/or the white filler (B)" refers to the content of one of these components when only one of the carbon black or the white filler is contained and refers to the total content thereof when both the carbon black and the white filler are contained.

In addition, when the carbon black and the white filler are used in combination, the content of the white filler is preferably from 5 to 85 parts by mass and more preferably from 15 to 75 parts by mass per 100 parts by mass of the diene rubber (A).

<Cured Product (C)>

The cured product (C) contained in the rubber composition for a tire of the present technology is not particularly limited as long as it is a cured product prepared by curing a crosslinkable oligomer or polymer (c1) which is incompatible with the diene rubber (A) and the JIS A hardness thereof is from 3 to 45.

Here, "incompatible (with the diene rubber (A))" does not mean that the cured product is incompatible with all of the rubber components contained in the diene rubber (A), but rather means that each of the specific components used in the diene rubber (A) and the crosslinkable oligomer or polymer (c1) are incompatible with one another.

In addition, a "cured product prepared by curing" refers to a cured product prepared by curing the crosslinkable oligomer or polymer (c1) in advance prior to mixing and preparing the rubber composition for a tire of the present technology. Note that the "crosslinkable oligomer or polymer (C)" described in International Patent Publication No. WO/2012/144605 and Japanese Unexamined Patent Application Publication No. 2013-010967A is not a cured product which is cured in advance, but is a component corresponding to the "crosslinkable oligomer or polymer (c1)" in the present technology.

In addition, the "JIS A hardness" is the durometer hardness prescribed by JIS K6253-3:2012 and refers to the hardness measured with a type-A durometer at a temperature of 25° C.

(Crosslinkable Oligomer or Polymer (c1))

The crosslinkable oligomer or polymer (c1) is not particularly limited as long as it is an oligomer or polymer which is incompatible with the diene rubber (A) and has crosslinkability.

Examples of the crosslinkable oligomer or polymer (c1) include polyether-based, polyester-based, polyolefin-based, polycarbonate-based, aliphatic, unsaturated hydrocarbon-based, acrylic, plant-derived, or siloxane-based polymers or copolymers.

Of these, the crosslinkable oligomer or polymer (c1) is preferably a polyether-based or siloxane-based polymer or copolymer from the perspective of thermal stability, molecular chain flexibility, hydrolysis resistance, or the like.

In addition, when the microparticles (D) described below are contained, the crosslinkable oligomer or polymer (c1) is preferably a polyether-based, polyester-based, polyolefin-based, polycarbonate-based, acrylic, or plant-derived polymer or copolymer from the perspective of suitably using an aliphatic polymer or copolymer (for example, a liquid diene polymer) as the oligomer or polymer (d1) described below. In particular, a polyether-based polymer or copolymer is more preferable in that it becomes easy to incorporate the microparticles (D) into the cured product (C) or from the perspective of heat resistance.

Here, examples of polyether-based polymers or copolymers include polyethylene glycol, polypropylene glycol (PPG), polypropylene triol, ethylene oxide/propylene oxide copolymers, polytetramethylene ether glycol (PTMEG), and sorbitol polyols.

In addition, examples of polyester-based polymers or copolymers include condensates (condensed polyester polyols) of low-molecular-weight polyhydric alcohols (for example, ethylene glycol, diethylene glycol, propylene glycol, and the like) and polybasic carboxylic acids (for example, adipic acid, sebacic acid, terephthalic acid, isophthalic acid, and the like); and lactone polyols.

Further, examples of polyolefin-based polymers or copolymers include polyethylene, polypropylene, ethylene propylene copolymers (EPR, EPDM), polybutylene, polyisobutylene, and hydrogenated polybutadiene.

In addition, examples of polycarbonate-based polymers or copolymers include substances obtained by a transesterification reaction between a polyol compound (for example, 1,6-hexanediol, 1,4-butanediol, 1,5-pentanediol, or the like) and a dialkylcarbonate.

Further, examples of acrylic polymers or copolymers include acryl polyol; single polymers of acrylates such as acrylate, methyl acrylate, ethyl acrylate, butyl acrylate, and 2-ethyl hexyl acrylate; and acrylate copolymers combining two or more types of these acrylates.

In addition, examples of plant-derived polymers or copolymers include vegetable fats and oils such as castor oil and soybean oil; and various elastomers derived from polyester polyols having modified polylactic acids or the like.

Further, examples of siloxane-based polymers or copolymers include polymers or copolymers having a siloxane structure represented by —(Si($R^1$)($R^2$)O)— (wherein $R^1$ and $R^2$ are each independently an alkyl group or phenyl group having from 1 to 4 carbon atoms) in the main chain thereof.

In the present technology, the crosslinkable oligomer or polymer (c1) preferably has at least one reactive functional group selected from the group consisting of hydroxyl groups, silane functional groups, isocyanate groups, (meth) acryloyl groups, allyl groups, carboxy groups, acid anhydride groups, and epoxy groups in that the cured product (C) can be easily formed by intermolecular crosslinking.

Here, the silane functional group is also known as a so-called crosslinkable silyl group, specific examples of which include hydrolyzable silyl groups; silanol groups; and functional groups in which silanol groups are substituted with acetoxy group derivatives, enoxy group derivatives, oxime group derivatives, amine derivatives, or the like.

Of these functional groups, it is preferable to have a silane functional group, an isocyanate group, an acid anhydride group, or an epoxy group in that the resulting cured product (C) can be easily formed into a particulate, and of these, it is more preferable to have a silane functional group (in particular, a hydrolyzable silyl group) and/or an isocyanate group.

Here, specific examples of hydrolyzable silyl groups include alkoxysilyl groups, alkenyloxysilyl groups, acyloxysilyl groups, aminosilyl groups, aminooxysilyl groups, oximesilyl groups, and amidosilyl groups.

Of these, alkoxysilyl groups are preferable in that the balance between hydrolyzability and storage stability is improved. Specifically, alkoxysilyl groups represented by the following formula (1) are more preferable, and methoxysilyl groups and ethoxysilyl groups are even more preferable.

(1)

(wherein $R^1$ is an alkyl group having from 1 to 4 carbon atoms; $R^2$ is a hydrogen atom or an alkyl group having from 1 to 4 carbon atoms; and a is an integer from 1 to 3. When a is 2 or 3, the plurality of $R^1$ moieties may respectively be the same or different, and when a is 1, the plurality of $R^1$ moieties may respectively be the same or different.)

In addition, the isocyanate group refers to an isocyanate group remaining when a hydroxyl group of a polyol compound (for example, a polycarbonate polyol or the like) and an isocyanate group of a polyisocyanate group are reacted.

The polyisocyanate compound is not particularly limited as long as it has at least two isocyanate groups in the molecule, and specific examples thereof include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPM), bis(isocyanate methyl) cyclohexane ($H_6$XDI), and dicyclohexylmethane diisocyanate ($H_{12}$MDI); carbodiimide-modified polyisocyanates thereof; and isocyanurate-modified polyisocyanates thereof.

In the present technology, the reactive functional group is preferably present in at least the main chain or a terminal of the crosslinkable oligomer or polymer (c1). When the main chain is a straight chain, it is preferable to have at least 1.5 groups and more preferably at least 2 groups. On the other hand, when the main chain is branched, it is preferable to have at least 3 groups.

In addition, in the present technology, the weight average molecular weight or number average molecular weight of the crosslinkable oligomer or polymer (c1) is preferably from 300 to 30,000 and more preferably from 2,000 to 20,000 in that the dispersibility of the resulting cured product (C) into the diene rubber (A) or the kneading workability of the rubber composition are improved, and in that when the composition further contains the microparticles (D) described below, it becomes easy to adjust the particle size or shape when prepared in the crosslinkable oligomer or polymer (c1).

Here, the weight average molecular weight and the number average molecular weight are both measured by gel permeation chromatography (GPC) in terms of standard polystyrene.

The curing method for curing such a crosslinkable oligomer or polymer (c1) is not particularly limited, but examples include methods of curing the substance using at least one type of a catalyst selected from the group consisting of acid catalysts, alkali catalysts, metal catalysts, and amine catalysts.

Of these, a method of curing the substance using an acid catalyst or a metal catalyst is preferable in that the curing efficiency is high.

Specific examples of acid catalysts include lactic acid, phthalic acid, lauryl acid, oleic acid, linoleic acid, linolenic acid, naphthenic acid, octenoic acid, octylic acid (2-ethylhexanoic acid), formic acid, acetic acid, propionic acid, butyric acid, valeric acid, caproic acid, caprylic acid, capric acid, lauric acid, myristic acid, benzoic acid, oxalic acid, malic acid, and citric acid. One type of these may be used alone, or two or more types may be used in combination.

In the present technology, an acid which is a liquid at room temperature is preferably used as the acid catalyst from the perspective of acidity or dispersibility. Specifically, lactic acid or formic acid is more preferably used.

Examples of metal catalysts include organic metal compounds such as tin octylate, and alkali metal alcoholates.

Specific examples of metal catalysts include tin carboxylate salts such as dimethyltin dilaurate, dibutyltin dilaurate, dibutyltin maleate, dibutyltin diacetate, tin octylate, and tin naphthalate; titanate esters such as tetrabutyl titanate and tetrapropyl titanate; organic aluminum compounds such as aluminum tris-acetylacetonate, and aluminum tris-ethyl acetoacetate, diisopropoxyaluminum ethyl acetoacetate; chelate compounds such as zirconium tetra-acetyl acetonate, and titanium tetra-acetylacetonate; and metal salts of octonoic acid such as lead octanoate and bismuth octanoate.

In the present technology, a tin carboxylate is more preferably used as the metal catalyst from the perspective of acidity.

In the present technology, the hardness of the cured product (C) is from 3 to 45, preferably from 3 to 30, more preferably from 3 to 20, and even more preferably from 3 to 15 in terms of the JIS A hardness.

In addition, in the present technology, the cured product (C) in the rubber composition for a tire of the present technology prepared by mixing the cured product (C) is preferably a particulate having an average particle size of from 5 to 250 µm in that the dispersibility in the diene rubber (A) is improved and that the on-ice performance and wear resistance of the studless winter tire are further improved.

Here, the average particle size of the cured product (C) in the rubber composition for a tire of the present technology refers to a value obtained by performing image analysis on the cross-section of a vulcanization sample of a rubber composition for a tire with an electron microscope (magnification: from approximately 500× to approximately 2000×), measuring the maximum length of the particles of the observed cured product (C) for a given ten or more particles, and averaging the result.

In addition, the numerical range (5 to 250 µm) of the average particle size of the cured product (C) overlaps with the numerical range (0.5 to 50 µm) of the average particle size of given microparticles (D) described below. When the composition contains the microparticles (D) described below, it is intended for the average particle size to be greater than the average particle size of specific microparticles (D) present inside the cured product (C). When the average particle size of the microparticles (D) is 10 µm, for example, it is intended for the average particle size of the cured product (C) to be greater than 10 µm and at most 250 µm.

Further, in the present technology, the content of the cured product (C) is from 0.3 to 30 parts by mass, preferably from 0.5 to 25 parts by mass, and more preferably from 1 to 15 parts by mass per 100 parts by mass of the diene rubber (A).

<Microparticles (D)>

The optional microparticles (D) which may be contained in the rubber composition for a tire of the present technology are three-dimensionally crosslinked microparticles having an average particle size of from 0.5 to 50 µm present inside the cured product (C).

Here, "present inside" means that the microparticles are present in a dispersed state inside the cured product (C) used as a matrix.

In addition, the "average particle size" refers to the average value of an equivalent circle diameter measured using a laser microscope and may be measured, for example, with a laser diffraction scattering type particle size distribution measurement device LA-300 (manufactured by Horiba, Ltd.), a laser microscope VK-8710 (manufactured by the Keyence Corporation), or the like. Here, the average particle size of the microparticles (D) is may be calculated as a value obtained by performing image analysis on the cross-section of a vulcanization sample of a rubber composition for a tire with an electron microscope (magnification: approximately 2000×), measuring the maximum length of the particles of the microparticles (D) observed inside the cured product (C) for a given ten or more particles, and averaging the result.

The average particle size of the microparticles (D) is preferably from 0.5 to 20 µm and more preferably from 0.5 to 10 µm in that the surface of the studless winter tire becomes moderately rough due to the cured product (C) and the on-ice performance is further improved.

The content when the composition contains the microparticles (D) is preferably from 0.1 to 12 parts by mass, more preferably from 0.3 to 10 parts by mass, and even more preferably from 0.5 to 10 parts by mass per 100 parts by mass of the diene rubber (A).

In the present technology, the microparticles (D) are preferably microparticles prepared by three-dimensionally crosslinking an oligomer or polymer (d1) incompatible with the crosslinkable oligomer or polymer (c1) in that it becomes easy to ensure that the microparticles (D) are present inside the cured product (C).

Here, "incompatible (with crosslinkable oligomer or polymer (c1))" does not mean that the microparticles are incompatible with all of the components contained in the crosslinkable oligomer or polymer (c1), but rather means that each of the specific components used in the crosslinkable oligomer or polymer (c1) and the oligomer or polymer (d1) are incompatible with one another.

(Oligomer or Polymer (d1))

Examples of the oligomer or polymer (d1) include polyether-based, polycarbonate-based, aliphatic, unsaturated hydrocarbon-based, acrylic, or plant-derived polymers or copolymers.

Here, examples of polyether-based polymers or copolymers include polyethylene glycol, polypropylene glycol (PPG), polypropylene triol, ethylene oxide/propylene oxide copolymers, polytetramethylene ether glycol (PTMEG), and sorbitol polyols.

In addition, examples of polycarbonate-based polymers or copolymers include substances obtained by a transesterification reaction between a polyol compound (for example, 1,6-hexanediol, 1,4-butanediol, 1,5-pentanediol, or the like) and a dialkylcarbonate.

Further, examples of aliphatic polymers or copolymers include liquid diene polymers such as polyisoprene, polybutadiene, and styrene-butadiene copolymers; chloroprene rubber; butyl rubber; nitrile rubber; and partially hydrogenated products thereof or altered products having the reactive functional groups described below.

In addition, unsaturated hydrocarbon-based polymers or copolymers include hydrogenated polyisoprene, hydrogenated polybutadiene, ethylene propylene, epichlorohydrin, chlorinated polyethylene, chlorosulfonated polyethylene, hydrogenated nitrile rubber, polyisobutylene, and acryl rubber.

Further, examples of acrylic polymers or copolymers include acryl polyol; single polymers of acrylates such as acrylate, methyl acrylate, ethyl acrylate, butyl acrylate, and 2-ethyl hexyl acrylate; and acrylate copolymers combining two or more types of these acrylates.

In addition, examples of plant-derived polymers or copolymers include vegetable fats and oils such as castor oil and soybean oil; and various elastomers derived from polyester polyols having modified polylactic acids or the like.

Of these, an aliphatic polymer or copolymer is preferable, and a liquid diene polymer is more preferable in that the on-ice performance and wear resistance of the studless winter tire are further improved.

Here, examples of commercially available liquid polyisoprenes include Kuraprene LIR-30 and Kuraprene LIR-50 (manufactured by Kuraray Co., Ltd.) as well as Poly ip (manufactured by Idemitsu Kosan Co., Ltd.).

In addition, examples of liquid polybutadiene include homopolymer-type substances such as Kuraprene LBR-305 (manufactured by Kuraray Co., Ltd.); copolymer-type substances of 1,2-bond-type butadiene and 1,4-bond-type butadiene such as Poly bd (manufactured by Idemitsu Kosan Co., Ltd.); and copolymer-type substances of ethylene, 1,4-bond-type butadiene, and 1,2-bond-type butadiene such as Kuraprene L-SBR-820 (manufactured by Kuraray Co., Ltd.).

In the present technology, from the perspective of being able to three-dimensionally crosslink only the oligomer or polymer (d1) in the crosslinkable oligomer or polymer (c1), the oligomer or polymer (d1) preferably has at least one reactive functional group selected from the group consisting of hydroxyl groups, mercapto groups, silane functional groups, isocyanate groups, (meth) acryloyl groups, allyl groups, carboxy groups, acid anhydride groups, and epoxy groups, the reactive functional group differing from the reactive functional group of the crosslinkable oligomer or polymer (c1).

Here, the silane functional group is also known as a so-called crosslinkable silyl group, specific examples of which include, as in the case of the silane functional group of the crosslinkable oligomer or polymer (c1), hydrolyzable silyl groups; silanol groups; and functional groups in which silanol groups are substituted with acetoxy group derivatives, enoxy group derivatives, oxime group derivatives, amine derivatives, or the like.

After the oligomer or polymer (d1) is three-dimensionally crosslinked, the crosslinkable oligomer or polymer (c1) may have the same reactive functional group as that of the oligomer or polymer (d1) (for example, a carboxy group, a hydrolyzable silyl group, or the like), or a functional group already contained therein may be modified into the same reactive functional group as that of the oligomer or polymer (d1).

Of these functional groups, it is preferable to have a hydroxyl group, a silane functional group, a carboxy group, or an acid anhydride group and more preferable to have a carboxy group or an acid anhydride group in that the three-dimensional crosslinking of the oligomer or polymer (d1) progresses smoothly.

Here, an example of a commercially available liquid polyisoprene having a carboxy group is Kuraprene LIR-410 (isoprene-monomethyl maleate ester-modified isoprene copolymer, number average molecular weight: 25,000, manufactured by Kuraray Co., Ltd.), and an example of a commercially available liquid polyisoprene having an acid anhydride group is Kuraprene LIR-403 (isoprene-maleic anhydride-modified isoprene copolymer, number average molecular weight: 34,000, manufactured by Kuraray Co., Ltd.).

In the present technology, the reactive functional group is preferably present in at least the main chain or a terminal of the oligomer or polymer (d1). When the main chain is a straight chain, it is preferable to have at least 1.5 groups and more preferably at least 2 groups. On the other hand, when the main chain is branched, it is preferable to have at least 3 groups.

In addition, in the present technology, the weight average molecular weight or the number average molecular weight of the oligomer or polymer (d1) is not particularly limited but is preferably from 1,000 to 100,000 and more preferably from 3,000 to 60,000 in that the particle size and crosslinking density of the microparticles (D) are moderate and that the on-ice performance of the studless winter tire is further improved.

Here, the weight average molecular weight or the number average molecular weight is respectively measured by gel permeation chromatography (GPC) in terms of standard polystyrene.

(Preparation Method for Microparticles (D))

The preparation method for the microparticles (D) is preferably a method of preparing the microparticles (D) by three-dimensionally crosslinking the oligomer or polymer (d1) in the crosslinkable oligomer or polymer (c1) from the perspective of ensuring that the microparticles (D) are present inside the cured product (C), and a preferable example is a method of three-dimensionally crosslinking the oligomer or polymer (d1) using the reactive functional group of the oligomer or polymer (d1). A specific example is a method of three-dimensionally crosslinking the oligomer or polymer (d1) by reacting the oligomer or polymer (d1) having the reactive functional group described above and at least one type of component (d2) selected from the group consisting of water, catalysts, and compounds having functional groups which reactive with the reactive functional group described above.

Here, water may be suitably used as the component (d2) when the oligomer or polymer (d1) has a hydrolyzable silyl group, an isocyanate group, or an acid anhydride group as a reactive functional group.

In addition, examples of catalysts serving as the component (d2) include condensation catalysts of silanol groups (silanol condensation catalysts).

Specific examples of silanol condensation catalysts include dibutyltin dilaurate, dibutyltin dioleate, dibutyltin diacetate, tetrabutyl titanate, and ferrous octanoate.

In addition, examples of compounds having functional groups which react with the reactive functional group of the component serving as the component (d2) include hydroxyl group-containing compounds, silanol compounds, hydrosilane compounds, diisocyanate compounds, amine compounds, oxazolidine compounds, enamine compounds, and ketimine compounds.

The hydroxyl group-containing compound may be suitably used when the oligomer or polymer (d1) has an isocyanate group or an acid anhydride group as a reactive functional group.

The hydroxyl group-containing compound is not particularly limited as long as it is a compound having at least two hydroxyl groups in each molecule. Examples include low-molecular-weight polyhydric alcohols, polyether polyols, polyester polyols, polycarbonate polyols, polycaprolactone polyols, other polyols, and mixed polyols thereof.

The silanol compound may be suitably used when the oligomer or polymer (d1) has a silane functional group as a reactive functional group.

Specific examples of silanol compounds include tert-butyldimethylsilanol, diphenylmethylsilanol, polydimethylsiloxanes having silanol groups, and cyclic polysiloxanes having silanol groups.

The hydrosilane compound is a compound having an SiH group and may be suitably used when the oligomer or polymer (d1) has an allyl group as a reactive functional group.

Specific examples of hydrosilane compounds include 1,1,3,3-tetramethyldisiloxane, 1,3,5,7-tetramethyltetracyclosiloxane, and 1,3,5,7,8-pentamethylpentacyclosiloxane.

The diisocyanate compound may be suitably used when the oligomer or polymer (d1) has a hydroxyl group as a reactive functional group.

Specific examples of diisocyanate compound include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; and aliphatic polyisocyanates such as hexamethylene diisocyanate (HDI), trimethylhexamethylene diisocyanate (TMHDI), lysine diisocyanate, and norbornane diisocyanate (NBDI).

The amine compound may be suitably used when the oligomer or polymer (d1) has an isocyanate group, a carboxy group, an acid anhydride group, an epoxy group, or the like as a reactive functional group.

The amine compound is not particularly limited with regard to the molecular weight, skeleton, and the like thereof as long as it is a compound having an amino group in each molecule, and examples thereof include primary amines such as butylamine, hexylamine, octylamine, dodecylamine, oleylamine, cyclohexylamine, and benzylamine; secondary amines such as dibutylamine; and polyamines such as diethylenetriamine, tri ethylenetetraamine, guanidine, diphenylguanidine, and xylylenediamine.

The oxazolindine compound, enamine compound, and ketimine compound may be suitably used when the oligomer or polymer (d1) has an isocyanate group, an acid anhydride group, an epoxy group, or the like as a reactive functional group.

Specifically, substances conventionally known as latent curing agents may be used as these compounds, and of these, it is preferable to use an oxazolidine compound and/or a ketimine compound.

The oxazolidine compound is not particularly limited as long as it is a compound having one or more oxazolidine rings, which are saturated 5-membered rings containing oxygen and nitrogen, in each molecule, and examples thereof include N-hydroxyalkyloxazolidine, oxazolidinesilyl ether, carbonate oxazolidine, and ester oxazolidine.

Commercially available products such as Hardener OZ (ester oxazolidine; manufactured by Sumika Bayer Urethane Co., Ltd.) may be used as such oxazolidine compounds.

The ketimine compound is a compound which produces a primary amine as a compound containing an active hydrogen group when hydrolyzed. In the present technology, a compound having a C=N bond (ketimine bond) derived from a ketone or aldehyde and an amine is called a ketimine, so ketimines also include aldimines having —HC=N bonds.

Examples of ketimines include substances having a structure in which branched carbon atoms or cyclic carbon atoms bond to the α-position of at least one atom among the carbon atoms or nitrogen atoms of the ketimine bond. Examples of cyclic carbon atoms include carbon atoms constituting an aromatic ring and carbon atoms constituting an alicycle.

Examples of specific ketimines include (1) katimines serving as reaction products of polyamines and carbonyl compounds and (2) silicon-containing ketimines serving as reaction products of aminoalkoxysilanes and carbonyl compounds.

Commercially available products such as jER-Cure H3 (manufactured by Mitsubishi Chemical Corporation) or KBE-9103 (manufactured by Shin-Etsu Chemical Co., Ltd.) may be used as such ketimine compounds.

In the present technology, a solvent may be used as necessary when preparing the microparticles (D) by three-dimensionally crosslinking the oligomer or polymer (d1) in the crosslinkable oligomer or polymer (c1).

An aspect of using the solvent is an aspect in which a plasticizer, a diluent, and a solvent which are good solvents for the oligomer or polymer (d1) and poor solvents for the crosslinkable oligomer or polymer (c1) are used, and/or an aspect in which a plasticizer, a diluent, and a solvent which are good solvents for the crosslinkable oligomer or polymer (c1) and poor solvents for the oligomer or polymer (d1) are used.

Specific examples of such solvents include aliphatic hydrocarbons such as n-pentane, isopentane, neopentane, n-hexane, 2-methylpentane, 3-methylpentane, 2,2-dimethylbutane, 2,3-dimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, and isooctane; alicyclic hydrocarbons such as cyclopentane, cyclohexane, and methyl cyclopentane; aromatic hydrocarbons such as xylene, benzene, and toluene; and terpene-based organic solvents such as α-pinene, β-pinene, and limonene.

In addition, in the present technology, additives such as a surfactant, an emulsifier, a dispersant, or a silane coupling agent are preferably used when preparing the microparticles (D) by three-dimensionally crosslinking the oligomer or polymer (d1) in the crosslinkable oligomer or polymer (c1).

<Silane Coupling Agent>

When the rubber composition for a tire of the present technology contains the white filler (silica, in particular), the rubber composition preferably contains a silane coupling agent in that the reinforcing performance of the tire is enhanced.

The content when the silane coupling agent is contained is preferably from 0.1 to 20 parts by mass and more preferably from 4 to 12 parts by mass per 100 parts by mass of the white filler.

Specific examples of the above silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyl tetrasulfide, and dimethoxymethylsilylpropyl benzothiazole tetrasulfide. One type of these may be used alone, or two or more types may be used in combination.

Of these, it is preferable to use bis-(3-triethoxysilylpropyl)tetrasulfide and/or bis-(3-triethoxysilylpropyl) disulfide from the perspective of the reinforcing property enhancing effect, and specific examples thereof include Si69 [bis-(3-triethoxysilylpropyl)tetrasulfide; manufactured by Evonik Degussa] and Si75 [bis-(3-triethoxysilylpropyl)disulfide; manufactured by Evonik Degussa].

Other Components

In addition to the above-mentioned components, the rubber composition for a tire of the present technology can contain a variety of other additives generally used in rubber compositions for tires in addition to the diene rubber (A), the carbon black and/or the white filler (B), and the cured product (C), including fillers such as calcium carbonate; vulcanizing agents such as sulfur; vulcanization accelerators such as sulfenamide-based, guanidine-based, thiazole-based, thiourea-based, and thiuram-based agents; vulcanization accelerator aids such as zinc oxide and stearic acid; waxes; aroma oils; antiaging agents; and plasticizers.

The compounded amount of these additives may be any conventional amount. For example, the composition may contain from 0.5 to 5 parts by mass of sulfur, from 0.1 to 5 parts by mass of a vulcanization accelerator, from 0.1 to 10 parts by mass of a vulcanization accelerator aid, from 0.5 to 5 parts by mass of an antiaging agent, from 1 to 10 parts by mass of a wax, and from 5 to 30 parts by mass of an aroma oil per 100 parts by mass of the diene rubber (A).

<Production Method for Rubber Composition for Tire>

There are no particular restrictions to the method for producing the rubber composition for a tire of the present technology, and an example is the method whereby each of the above-mentioned components is kneaded using a publicly known method and device (such as a Banbury mixer, kneader, or roll).

In addition, the rubber composition for a tire of the present technology can be vulcanized or crosslinked under conventional, publicly known vulcanizing or crosslinking conditions.

[Studless Winter Tire]

The studless winter tire of the present technology (also simply called the "tire of the present technology" hereafter) is a studless winter tire in which the rubber composition for a tire of the present technology described above is used for a tire tread.

Figure 1:
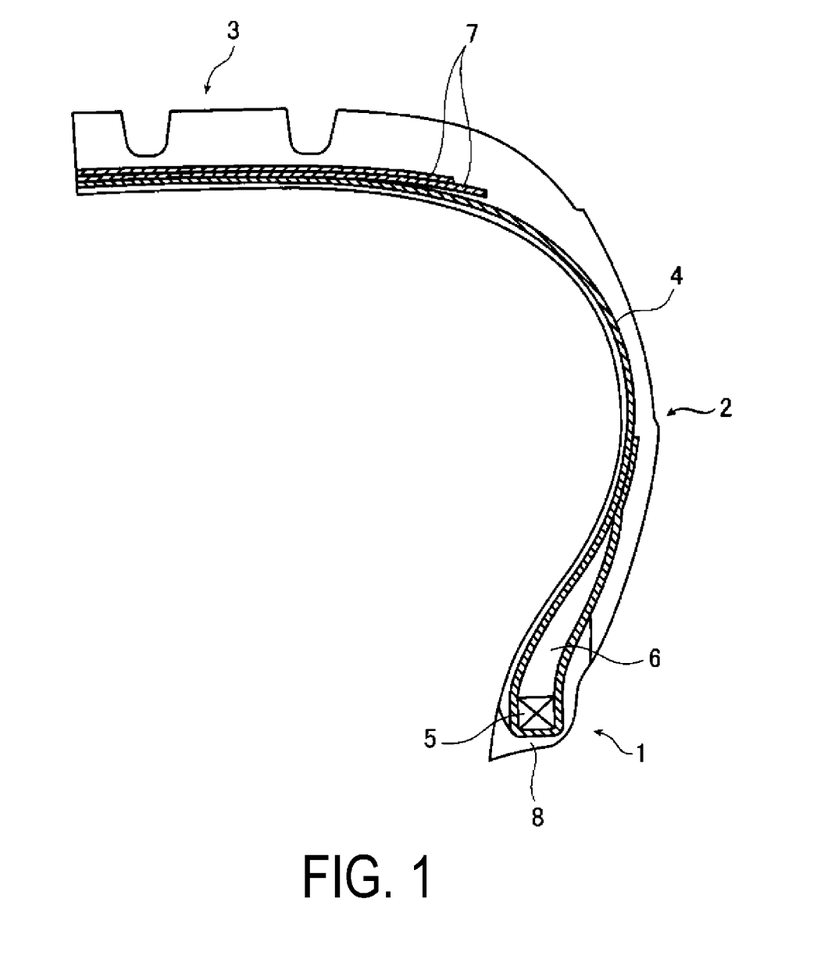
FIG. 1 is a partial cross-sectional schematic view of a tire that represents one embodiment of the studless winter tire of the present technology.

FIG. 1 is a partial cross-sectional schematic view of a tire that represents one embodiment of the studless winter tire of the present technology, but the tire of the present technology is not limited to the embodiment illustrated in FIG. 1.

In FIG. 1, reference numeral 1 represents a bead portion, 2 represents a side wall portion, and 3 represents a tread portion formed from the rubber composition for a tire of the present technology.

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In the tire tread portion 3, a belt layer 7 is provided along the entire periphery of the tire on the outer side of the carcass layer 4.

Additionally, rim cushions 8 are provided in parts of the bead portions 1 that are in contact with a rim.

The tire of the present technology can be produced by, for instance, forming a tire tread portion by vulcanization or crosslinking at a temperature corresponding to the type and compounding ratio of the diene rubber, vulcanizing agent or crosslinking agent, and vulcanization or crosslinking accelerator used in the rubber composition of the present technology.

EXAMPLES

<Crosslinkable Polymer 1>

A hydrolyzable silyl group-terminated polyoxypropylene glycol (MS Polymer S810, manufactured by the Kaneka Corporation) was used as a crosslinkable polymer 1.

Here, a photograph of the cross-section of a vulcanized rubber sheet produced from the rubber composition of Comparative Example 1-1 containing an uncured crosslinkable polymer 1, which was taken using a scanning microscope at a magnification of 2000×, is illustrated in FIG. 4. In FIG. 4, the broken line indicates one region in which a particulate (cured product after vulcanization) derived from a hydrolyzable silyl group-terminated polyoxypropylene glycol corresponding to the crosslinkable oligomer or polymer (c1) is present.

<Preparation of Cured Product 1>

First, 0.1 parts by mass of lactic acid (acid catalyst) was added to 10 parts by mass of a paste-like product of the crosslinkable polymer 1.

Next, after the mixture was sufficiently stirred, the mixture was cured for two days at room temperature to prepare a cured product 1.

The JIS A hardness of the resulting cured product 1 and the average particle size of the cured product 1 in a vulcanized rubber sheet produced from the rubber composition of Working Example 1-1 prepared using the cured product are shown in Table 1 below.

<Preparation of Cured Product 2>

First, 0.5 parts by mass of lactic acid (acid catalyst) was added to 10 parts by mass of a paste-like product of the crosslinkable polymer 1.

Next, after the mixture was sufficiently stirred, the mixture was cured for two days at room temperature to prepare a cured product 2.

The JIS A hardness of the resulting cured product 2 and the average particle size of the cured product 2 in a vulcanized rubber sheet produced from the rubber composition of Working Example 1-2 prepared using the cured product are shown in Table 1.

<Preparation of Cured Product 3>

First, 1.0 parts by mass of lactic acid (acid catalyst) was added to 10 parts by mass of a paste-like product of the crosslinkable polymer 1.

Next, after the mixture was sufficiently stirred, the mixture was cured for two days at room temperature to prepare a cured product 3.

The JIS A hardness of the resulting cured product 3 and the average particle size of the cured product 3 in a vulcanized rubber sheet produced from the rubber composition of Working Example 1-3 prepared using the cured product are shown in Table 1.

Here, a photograph of the cross-section of a vulcanized rubber sheet produced from the rubber composition of Working Example 1-3 containing the cured product 3, which was taken using a scanning microscope at a magnification of 2000×, is illustrated in FIG. 2. In FIG. 2, the broken line indicates one region in which a particulate derived from cured product (C) prepared by curing the crosslinkable oligomer or polymer (c1) is present.

<Preparation of Cured Product 4>

First, 2.0 parts by mass of lactic acid (acid catalyst) was added to 10 parts by mass of a paste-like product of the crosslinkable polymer 1.

Next, after the mixture was sufficiently stirred, the mixture was cured for two days at room temperature to prepare a cured product 4.

The JIS A hardness of the resulting cured product 4 and the average particle size of the cured product 4 in a vulcanized rubber sheet produced from the rubber composition of Working Example 1-4 prepared using the cured product are shown in Table 1.

<Preparation of Cured Product 5>

First, 1 part by mass of tin octylate (metal catalyst) and 1 part by mass of water were added to 50 parts by mass of a paste-like product of the crosslinkable polymer 1.

Next, after the mixture was sufficiently stirred, the mixture was cured for two days at room temperature to prepare a cured product (also called "cured product 5" hereafter).

The JIS A hardness of the resulting cured product 5 and the average particle size of the cured product 5 in a vulcanized rubber sheet produced from the rubber composition of Working Example 1-5 prepared using the cured product are shown in Table 1.

<Preparation of Cured Product 6>

First, 1 part by mass of dibutyltin diacetate (metal catalyst), 4 parts by mass of laurylamine, and 1 part by mass of water were added to 50 parts by mass of a paste-like product of the crosslinkable polymer 1.

Next, after the mixture was sufficiently stirred, the mixture was cured for two days at room temperature to prepare a cured product (also called "cured product 6" hereafter).

The JIS A hardness of the resulting cured product 6 and the average particle size of the cured product 6 in a vulcanized rubber sheet produced from the rubber composition of Working Example 1-6 prepared using the cured product are shown in Table 1.

<Preparation of Cured Product 7>

First, 5.0 parts by mass of lactic acid (acid catalyst) was added to 10 parts by mass of a paste-like product of the crosslinkable polymer 1.

Next, after the mixture was sufficiently stirred, the mixture was cured for two days at room temperature to prepare a cured product 7.

The JIS A hardness of the resulting cured product 7 and the average particle size of the cured product 7 in a vulcanized rubber sheet produced from the rubber composition of Comparative Example 1-2 prepared using the cured product are shown in Table 1.

<Preparation of Cured Product 8>

First, 10.0 parts by mass of lactic acid (acid catalyst) was added to 10 parts by mass of a paste-like product of the crosslinkable polymer 1.

Next, after the mixture was sufficiently stirred, the mixture was cured for two days at room temperature to prepare a cured product 8.

The JIS A hardness of the resulting cured product 8 and the average particle size of the cured product 8 in a vulcanized rubber sheet produced from the rubber composition of Comparative Example 1-3 prepared using the cured product are shown in Table 1.

<Preparation of Microparticle-Containing Crosslinkable Polymer 1>

First, 200 g of a maleic acid-modified liquid polyisoprene rubber (Kuraprene LIR-403, number average molecular weight: 34,000, manufactured by Kuraray Co., Ltd.), 120 g of a process oil (Dynaprocess Oil PS-32, manufactured by Idemitsu Kosan Co., Ltd.), 16 g of an oxazolidine compound (Hardener OZ, manufactured by Sumika Bayer Urethane Co., Ltd.), 1,600 g of a hydrolyzable silyl group-terminated polyoxypropylene glycol (MS Polymer S810, manufactured by the Kaneka Corporation), and 5 g of water were stirred with a two-shaft concentric mixer (manufactured by Inoue Manufacturing, Inc.) for one hour at a low speed of 36 rpm and a high-speed disper of 600 rpm.

Next, 6 g of a pluronic-type non-ionic surfactant (Newpol PE-64, manufactured by Sanyo Chemical Industries, Ltd.) and 6 g of aminosilane (A1110, manufactured by the NUC Corporation) were added to this mixture and further stirred for 30 minutes at a low speed of 36 rpm and a high-speed disper of 2,000 rpm to prepare a paste-like product (also called the "microparticle-containing crosslinkable polymer 1" hereafter).

When this paste-like product was observed using a laser microscope VK-8710 (manufactured by the Keyence Corporation), it was confirmed that microparticles having a particle size of from 0.5 to 10 μm (skeleton: polyisoprene, crosslink: amide ester bond) were produced and were dispersed in the hydrolyzable silyl group-terminated polyoxypropylene glycol. In addition, as a result of subjecting this image to image processing to form a 3D profile, the content (mass %) of microparticles in the paste-like product was approximately 11%.

<Preparation of Microparticle-Containing Cured Product 1>

First, 5 parts by mass of lactic acid (acid catalyst) was added to 10 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 1" hereafter).

The JIS A hardness of the resulting microparticle-containing cured product 1 and the average particle size of the microparticle-containing cured product 1 in a vulcanized rubber sheet produced from the rubber composition of Comparative Example 2-2 prepared using the microparticle-containing cured product are shown in Table 2 below.

<Preparation of Microparticle-Containing Cured Product 2>

First, 10 parts by mass of lactic acid (acid catalyst) was added to 10 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 2" hereafter).

The JIS A hardness of the resulting microparticle-containing cured product 2 and the average particle size of the microparticle-containing cured product 2 in a vulcanized rubber sheet produced from the rubber composition of Comparative Example 2-3 prepared using the microparticle-containing cured product are shown in Table 2 below.

<Preparation of Microparticle-Containing Cured Product 3>

First, 0.05 parts by mass of lactic acid (acid catalyst) was added to 10 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 3" hereafter).

The JIS A hardness of the resulting microparticle-containing cured product 3 and the average particle size of the microparticle-containing cured product 3 in a vulcanized rubber sheet produced from the rubber composition of Working Example 2-1 prepared using the microparticle-containing cured product are shown in Table 2 below.

<Preparation of Microparticle-Containing Cured Product 4>

First, 0.1 parts by mass of lactic acid (acid catalyst) was added to 10 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 4" hereafter).

The JIS A hardness of the resulting microparticle-containing cured product 4 and the average particle size of the microparticle-containing cured product 4 in a vulcanized rubber sheet produced from the rubber composition of Working Example 2-2 prepared using the microparticle-containing cured product are shown in Table 2 below.

<Preparation of Microparticle-Containing Cured Product 5>

First, 0.5 parts by mass of lactic acid (acid catalyst) was added to 10 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 5" hereafter).

The JIS A hardness of the resulting microparticle-containing cured product 5 and the average particle size of the microparticle-containing cured product 5 in a vulcanized rubber sheet produced from the rubber composition of Working Example 2-3 prepared using the microparticle-containing cured product are shown in Table 2 below.

<Preparation of Microparticle-Containing Cured Product 6>

First, 1 parts by mass of lactic acid (acid catalyst) was added to 10 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 6" hereafter).

The JIS A hardness of the resulting microparticle-containing cured product 6 and the average particle size of the microparticle-containing cured product 6 in a vulcanized rubber sheet produced from the rubber composition of Working Example 2-4 prepared using the microparticle-containing cured product are shown in Table 2 below.

Figure 3:
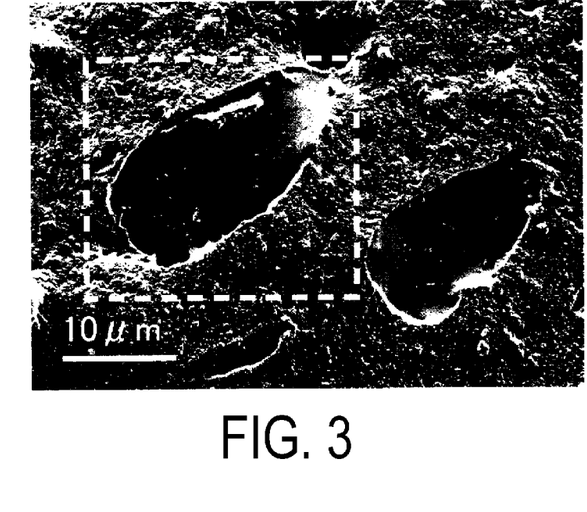
FIG. 3 is a photograph of the cross-section of a vulcanization test sample of the rubber composition for a tire prepared in Working Example 2-4 at a magnification of 2000× using a scanning microscope.

Here, a photograph of the cross-section of a vulcanized rubber sheet produced from the rubber composition of Working Example 2-4 containing the microparticle-containing cured product 6, which was taken using a scanning microscope at a magnification of 2000×, is illustrated in FIG. 3. In FIG. 3, the broken line indicates one region in which a particulate derived from cured product (C) prepared by curing the crosslinkable oligomer or polymer (c1) is present.

<Preparation of Microparticle-Containing Cured Product 7>

First, 2 parts by mass of lactic acid (acid catalyst) was added to 10 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 7" hereafter).

The JIS A hardness of the resulting microparticle-containing cured product 7 and the average particle size of the microparticle-containing cured product 7 in a vulcanized rubber sheet produced from the rubber composition of Working Example 2-5 prepared using the microparticle-containing cured product are shown in Table 2 below.

<Preparation of Microparticle-Containing Cured Product 8>

First, 1 part by mass of tin octylate (metal catalyst) and 1 part by mass of water were added to 50 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 8" hereafter).

The JIS A hardness of the resulting microparticle-containing cured product 8 and the average particle size of the microparticle-containing cured product 8 in a vulcanized rubber sheet produced from the rubber composition of Working Example 2-6 prepared using the microparticle-containing cured product are shown in Table 2 below.

<Preparation of Microparticle-Containing Cured Product 9>

First, 1 part by mass of tin octylate (metal catalyst), 4 parts by mass of laurylamine, and 1 part by mass of water were added to 50 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 9" hereafter).

The JIS A hardness of the resulting microparticle-containing cured product 9 and the average particle size of the microparticle-containing cured product 9 in a vulcanized rubber sheet produced from the rubber composition of Working Example 2-7 prepared using the microparticle-containing cured product are shown in Table 2 below.

<Preparation of Microparticle-Containing Cured Product 10>

First, 1 part by mass of dibutyltin diacetate (metal catalyst) and 1 part by mass of water were added to 50 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 10" hereafter).

The JIS A hardness of the resulting microparticle-containing cured product 10 and the average particle size of the microparticle-containing cured product 10 in a vulcanized rubber sheet produced from the rubber composition of Working Example 2-8 prepared using the microparticle-containing cured product are shown in Table 2 below.

<Preparation of Microparticle-Containing Cured Product 11>

First, 1 part by mass of dibutyltin diacetate (metal catalyst), 4 parts by mass of laurylamine, and 1 part by mass of water were added to 50 parts by mass of a paste-like product of the microparticle-containing crosslinkable polymer 1.

Next, after the mixture was sufficiently stirred, the mixture was cured for two days at room temperature to prepare a cured product containing microparticles therein (also called "microparticle-containing cured product 11" hereafter).

The JIS A hardness of the resulting microparticle-containing cured product 11 and the average particle size of the microparticle-containing cured product 11 in a vulcanized rubber sheet produced from the rubber composition of Working Example 2-9 prepared using the microparticle-containing cured product are shown in Table 2 below.

Working Examples 1-1 to 1-6 and Comparative Examples 1-1 to 1-3

The components shown in Table 1 below were blended in the proportions (parts by mass) shown in Table 1.

Specifically, a master batch was obtained by first kneading the components shown in Table 1 below, except for the sulfur and the vulcanization accelerator, for 5 minutes in a 7 liter closed type mixer, and then discharging the kneaded product when the temperature reached 150° C.

Next, a rubber composition was obtained by kneading the sulfur and the vulcanization accelerator with the obtained master batch using an open roll.

A vulcanized rubber sheet was then produced by vulcanizing the obtained rubber composition for 10 minutes at 170° C. in a mold for Lambourn abrasion (disk having a diameter of 63.5 mm and thickness of 5 mm).

Working Examples 2-1 to 2-9 and Comparative Examples 2-1 to 2-3

The components shown in Table 2 below were blended in the proportions (parts by mass) shown in Table 2.

Specifically, a master batch was obtained by first kneading the components shown in Table 2 below, except for the sulfur and the vulcanization accelerator, for 5 minutes in a 7 liter closed type mixer, and then discharging the kneaded product when the temperature reached 150° C.

Next, a rubber composition was obtained by kneading the sulfur and the vulcanization accelerator with the obtained master batch using an open roll.

A vulcanized rubber sheet was then produced by vulcanizing the obtained rubber composition for 10 minutes at 170° C. in a mold for Lambourn abrasion (disk having a diameter of 63.5 mm and thickness of 5 mm).

<On-Ice Performance>

Each vulcanized rubber sheet that was produced was affixed to a flat cylindrical rubber base, and the coefficient of friction on ice was measured using an inside drum-type on-ice friction tester. The measurement temperature was set to −1.5° C., and measurements were performed with a load of 5.5 g/cm$^3$ and a drum rotation speed of 25 km/h.

The test results are expressed as indices using the following formulae in the "On-ice performance" sections of Tables 1 and 2, wherein the measurement value of Comparative Example 1-1 is defined as 100 for Table 1, and the measurement value of Comparative Example 2-1 is defined as 100 for Table 2. Larger indices indicate a larger on-ice frictional force and thus better on-ice performance.

Index=(measurement value/on-ice coefficient of friction of test piece of Comparative Example 1-1)×100

Index=(measurement value/on-ice coefficient of friction of test piece of Comparative Example 2-1)×100

<Wear Resistance>

Wear tests were performed under conditions with an applied force of 4.0 kg/cm$^3$ (=39 N), a slip ratio of 30%, a wear test time of 4 minutes, and a test temperature of room temperature using a Lambourn wear tester (manufactured by Iwamoto Seisakusho Co. Ltd.) in accordance with JIS K 6264-2:2005, and the wear mass was measured.

The test results are expressed as indices using the following formulae in the "Wear resistance" sections of Tables 1 and 2, wherein the measurement value of Comparative Example 1-1 is defined as 100 for Table 1, and the measurement value of Comparative Example 2-1 is defined as 100 for Table 2. Larger indices indicate a smaller amount of wear and better wear resistance.

Index=(wear mass of test piece of Comparative Example 1-1/measurement value)×100

Index=(wear mass of test piece of Comparative Example 2-1/measurement value)×100

TABLE 1

|  | Comparative Examples | Working Examples | | | | | | Comparative Examples | |
| --- | --- | --- | --- | --- | --- | --- | --- | --- | --- |
|  | 1-1 | 1-1 | 1-2 | 1-3 | 1-4 | 1-5 | 1-6 | 1-2 | 1-3 |
| NR | 60 | 60 | 60 | 60 | 60 | 60 | 60 | 60 | 60 |
| BR | 40 | 40 | 40 | 40 | 40 | 40 | 40 | 40 | 40 |
| Carbon black | 50 | 50 | 50 | 50 | 50 | 50 | 50 | 50 | 50 |
| Silica | 15 | 15 | 15 | 15 | 15 | 15 | 15 | 15 | 15 |
| Silane coupling agent | 1.5 | 1.5 | 1.5 | 1.5 | 1.5 | 1.5 | 1.5 | 1.5 | 1.5 |
| Crosslinkable polymer 1 | 10.0 | | | | | | | | |
| Cured product 1 | | 10.1 | | | | | | | |
| Cured product 2 | | | 10.5 | | | | | | |
| Cured product 3 | | | | 11.0 | | | | | |
| Cured product 4 | | | | | 12.0 | | | | |
| Cured product 5 | | | | | | 10.4 | | | |
| Cured product 6 | | | | | | | 11.2 | | |
| Cured product 7 | | | | | | | | 15.0 | |
| Cured product 8 | | | | | | | | | 20.0 |
| Zinc oxide | 3 | 3 | 3 | 3 | 3 | 3 | 3 | 3 | 3 |
| Stearic acid | 1 | 1 | 1 | 1 | 1 | 1 | 1 | 1 | 1 |
| Antiaging agent 1 | 1.5 | 1.5 | 1.5 | 1.5 | 1.5 | 1.5 | 1.5 | 1.5 | 1.5 |
| Antiaging agent 2 | 1.5 | 1.5 | 1.5 | 1.5 | 1.5 | 1.5 | 1.5 | 1.5 | 1.5 |
| Oil | 30 | 30 | 30 | 30 | 30 | 30 | 30 | 30 | 30 |
| Sulfur | 1.5 | 1.5 | 1.5 | 1.5 | 1.5 | 1.5 | 1.5 | 1.5 | 1.5 |
| Vulcanization accelerator | 1.5 | 1.5 | 1.5 | 1.5 | 1.5 | 1.5 | 1.5 | 1.5 | 1.5 |
| JIS A hardness of cured product | Uncured | 8 | 10 | 11 | 10 | 9 | 12 | 2 | 1 |

TABLE 1-continued

|  | Comparative Examples | Working Examples | | | | | | Comparative Examples | |
|---|---|---|---|---|---|---|---|---|---|
|  | 1-1 | 1-1 | 1-2 | 1-3 | 1-4 | 1-5 | 1-6 | 1-2 | 1-3 |
| Average particle size of cured product (μm) | 4* | 38 | 46 | 35 | 27 | 32 | 56 | 4 | 4 |
| Performance on ice | 100 | 102 | 105 | 107 | 110 | 111 | 108 | 92 | 89 |
| Wear resistance | 100 | 110 | 113 | 118 | 112 | 110 | 109 | 105 | 102 |

*Average particle size of particulate (cured product) after the vulcanization of crosslinkable polymer 1

TABLE 2-1

|  | Comparative Examples | | |
|---|---|---|---|
|  | 2-1 | 2-2 | 2-3 |
| NR | 60 | 60 | 60 |
| BR | 40 | 40 | 40 |
| Carbon black | 50 | 50 | 50 |
| Silica | 15 | 15 | 15 |
| Silane coupling agent | 1.5 | 1.5 | 1.5 |
| Microparticle-containing crosslinkable polymer 1 (microparticle content) | 10.00 (1.10) | | |
| Microparticle-containing cured product 1 (microparticle content) |  | 15.00 (1.10) |  |
| Microparticle-containing cured product 2 (microparticle content) |  |  | 20.00 (1.10) |
| Zinc oxide | 3 | 3 | 3 |
| Stearic acid | 1 | 1 | 1 |
| Antiaging agent 1 | 1.5 | 1.5 | 1.5 |
| Antiaging agent 2 | 1.5 | 1.5 | 1.5 |
| Oil | 30 | 30 | 30 |
| Sulfur | 1.5 | 1.5 | 1.5 |
| Vulcanization accelerator | 1.5 | 1.5 | 1.5 |
| JIS A hardness of cured product | Uncured | 2 | 1 |
| Average particle size of cured product (μm) | 4* | 4 | 4 |
| Performance on ice | 100 | 92 | 89 |
| Wear resistance | 100 | 114 | 106 |

*Average particle size of particulate (cured product) after the vulcanization of crosslinkable polymer 1

TABLE 2-2

|  | Working Example | | | | |
|---|---|---|---|---|---|
|  | 2-1 | 2-2 | 2-3 | 2-4 | 2-5 |
| NR | 60 | 60 | 60 | 60 | 60 |
| BR | 40 | 40 | 40 | 40 | 40 |
| Carbon black | 50 | 50 | 50 | 50 | 50 |
| Silica | 15 | 15 | 15 | 15 | 15 |
| Silane coupling agent | 1.5 | 1.5 | 1.5 | 1.5 | 1.5 |
| Microparticle-containing cured product 3 (microparticle content) | 10.05 (1.10) |  |  |  |  |
| Microparticle-containing cured product 4 (microparticle content) |  | 10.10 (1.10) |  |  |  |
| Microparticle-containing cured product 5 (microparticle content) |  |  | 10.50 (1.10) |  |  |
| Microparticle-containing cured product 6 (microparticle content) |  |  |  | 11.00 (1.10) |  |
| Microparticle-containing cured product 7 (microparticle content) |  |  |  |  | 12.00 (1.10) |
| Zinc oxide | 3 | 3 | 3 | 3 | 3 |
| Stearic acid | 1 | 1 | 1 | 1 | 1 |
| Antiaging agent 1 | 1.5 | 1.5 | 1.5 | 1.5 | 1.5 |
| Antiaging agent 2 | 1.5 | 1.5 | 1.5 | 1.5 | 1.5 |
| Oil | 30 | 30 | 30 | 30 | 30 |
| Sulfur | 1.5 | 1.5 | 1.5 | 1.5 | 1.5 |
| Vulcanization accelerator | 1.5 | 1.5 | 1.5 | 1.5 | 1.5 |
| JIS A hardness of cured product | 23 | 20 | 16 | 11 | 11 |
| Average particle size of cured product (μm) | 32 | 43 | 53 | 31 | 30 |
| On-ice performance | 101 | 105 | 106 | 106 | 103 |
| Wear resistance | 106 | 118 | 114 | 114 | 118 |

TABLE 2-3

|  | Working Example | | | |
|---|---|---|---|---|
|  | 2-6 | 2-7 | 2-8 | 2-9 |
| NR | 60 | 60 | 60 | 60 |
| BR | 40 | 40 | 40 | 40 |
| Carbon black | 50 | 50 | 50 | 50 |
| Silica | 15 | 15 | 15 | 15 |
| Silane coupling agent | 1.5 | 1.5 | 1.5 | 1.5 |
| Microparticle-containing cured product 8 (microparticle content) | 10.40 (1.10) |  |  |  |
| Microparticle-containing cured product 9 (microparticle content) |  | 11.20 (1.10) |  |  |
| Microparticle-containing cured product 10 (microparticle content) |  |  | 10.40 (1.10) |  |
| Microparticle-containing cured product 11 (microparticle content) |  |  |  | 11.20 (1.10) |
| Zinc oxide | 3 | 3 | 3 | 3 |
| Stearic acid | 1 | 1 | 1 | 1 |
| Antiaging agent 1 | 1.5 | 1.5 | 1.5 | 1.5 |
| Antiaging agent 2 | 1.5 | 1.5 | 1.5 | 1.5 |
| Oil | 30 | 30 | 30 | 30 |
| Sulfur | 1.5 | 1.5 | 1.5 | 1.5 |
| Vulcanization accelerator | 1.5 | 1.5 | 1.5 | 1.5 |
| JIS A hardness of cured product | 12 | 15 | 15 | 18 |
| Average particle size of cured product (μm) | 35 | 65 | 32 | 73 |
| ON-ice performance | 109 | 122 | 123 | 112 |
| Wear resistance | 113 | 116 | 111 | 108 |

The respective components shown in Tables 1 and 2 are as follows.

NR: natural rubber (STR 20)
BR: Polybutadiene rubber (Nippol BR 1220, glass transition temperature: −11° C., manufactured by the Zeon Corporation)
Carbon black: SEAST KH (manufactured by Tokai Carbon Co., Ltd.)
Silica: Nipsil AQ (manufactured by Japan Silica Industry Co., Ltd.)
Silane coupling agent: Silane coupling agent (Si69, manufactured by Evonik Degussa)
Crosslinkable polymer 1: Produced as described above
Cured products 1 to 8: Produced as described above
Microparticle-containing crosslinkable polymer 1: Produced as described above Microparticle-containing cured products 1 to 11: Produced as described above Zinc oxide: Zinc Oxide #3 (manufactured by Seido Chemical Co., Ltd.)

Stearic acid: Stearic acid beads YR (manufactured by Nippon Oil & Fats Co., Ltd.)

Antiaging agent 1: Amine antiaging agent (Santoflex 6PPD, manufactured by Flexis)

Antiaging agent 2: Amine-ketone antiaging agent (Nocrac 224, (manufactured by Ouchi Shinko Chemical Industrial Co., Ltd.)

Oil: Aroma oil (Extract No. 4S, manufactured by Showa Shell Sekiyu K.K.)

Sulfur: "Golden Flower" oil-treated sulfur powder (manufactured by Tsurumi Chemical Industry Co., Ltd.)

Vulcanization accelerator: Sulfenamide vulcanization accelerator (Nocceler CZ-G, manufactured by Ouchi Shinko Chemical Industrial Co., Ltd.)

It can be seen from the results shown in Table 1 that Comparative Examples 1-2 and 1-3, which are cured products but have a cured product hardness of less than 3, exhibit on-ice performance inferior to that of Comparative Example 1-1.

In contrast, it can be seen that Working Examples 1-1 to 1-6, which contain a cured product (C) having a cured product hardness of from 3 to 45, all exhibit better on-ice performance and wear resistance than Comparative Example 1-1.

It can be seen from the results shown in Table 2 that Comparative Examples 2-2 and 2-3, which are cured products containing microparticles (D) therein but have a cured product hardness of less than 3, exhibit on-ice performance inferior to that of Comparative Example 2-1.

In contrast, it can be seen that Working Examples 2-1 to 2-9, which contain a cured product (C) containing microparticles (D) therein and having a cured product hardness of from 3 to 30, all exhibit better on-ice performance and wear resistance than Comparative Example 2-1.

The invention claimed is:

1. A rubber composition for a tire comprising: 100 parts by mass of a diene rubber (A); from 30 to 100 parts by mass of carbon black and/or a white filler (B); and
    from 0.3 to 30 parts by mass of a cured product (C) prepared by curing a crosslinkable oligomer or polymer (c1) which is incompatible with the diene rubber (A); a JIS A hardness of the cured product (C) being from 3 to 45;
    wherein the cured product (C) is a particulate having an average particle size of from 5 to 250 μm; and the crosslinkable oligomer or polymer (c1) is a polyether-based polymer or copolymer.

2. The rubber composition for a tire according to claim 1 further comprising from 0.1 to 12 parts by mass of three-dimensionally crosslinked microparticles (D) having an average particle size of from 0.5 to 50 μm; wherein the microparticles (D) are present inside the cured product (C).

3. The rubber composition for a tire according to claim 1, wherein a JIS A hardness of the cured product (C) is from 3 to 30.

4. The rubber composition for a tire according to claim 2, wherein the microparticles (D) are microparticles prepared by three-dimensionally crosslinking an oligomer or polymer (d1) which is incompatible with the crosslinkable oligomer or polymer (c1).

5. The rubber composition for a tire according to claim 1, wherein the crosslinkable oligomer or polymer (c1) has a silane functional group.

6. The rubber composition for a tire according to claim 1, wherein the diene rubber (A) contains at least 30 mass % of at least one type rubber selected from the group consisting of natural rubber (NR), isoprene rubber (IR), butadiene rubber (BR), acrylonitrile-butadiene rubber (NBR), styrene-butadiene rubber (SBR), styrene-isoprene rubber (SIR), styrene-isoprene-butadiene rubber (SIBR), and derivatives of each of these rubbers.

7. The rubber composition for a tire according to claim 4, wherein the oligomer or polymer (d1) is an aliphatic, polymer or copolymer.

8. The rubber composition for a tire according to claim 4, wherein the crosslinkable oligomer or polymer (c1) has at least one reactive functional group selected from the group consisting of hydroxyl groups, silane functional groups, isocyanate groups, (meth) acryloyl groups, allyl groups, carboxy groups, acid anhydride groups, and epoxy groups.

9. The rubber composition for a tire according to claim 8, wherein the oligomer or polymer (d1) has at least one reactive functional group selected from the group consisting of hydroxyl groups, mercapto groups, silane functional groups, isocyanate groups, (meth) acryloyl groups, allyl groups, carboxy groups, acid anhydride groups, and epoxy groups, the reactive functional group differing from the reactive functional group of the crosslinkable oligomer or polymer (c1).

10. The rubber composition for a tire according to claim 9, wherein the microparticles (D) are prepared by three-dimensional crosslinking using the reactive functional group of the oligomer or polymer (d1) in the crosslinkable oligomer or polymer (c1); and the cured product (C) is prepared by curing the crosslinkable oligomer or polymer (c1) using at least one type of catalyst selected from the group consisting of acid catalysts, alkali catalysts, metal catalysts, and amine catalysts after three-dimensionally crosslinking the oligomer or polymer (d1) in the crosslinkable oligomer or polymer (c1).

11. A studless winter tire using the rubber composition for a tire described in claim 1 for a tire tread.

12. A studless winter tire using the rubber composition for a tire described in claim 2 for a tire tread.

* * * * *